(12) United States Patent
Wilson

(10) Patent No.: US 6,937,813 B1
(45) Date of Patent: Aug. 30, 2005

(54) DIGITAL VIDEO STORAGE AND REPLAY SYSTEM

(75) Inventor: Andrew T. Wilson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,377

(22) Filed: Mar. 31, 2000

(51) Int. Cl.$^7$ .............................................. H04N 5/91
(52) U.S. Cl. ........................... 386/46; 386/70; 386/125
(58) Field of Search ................... 386/46, 125–126, 386/68, 82, 124, 95, 52, 70

(56) References Cited

U.S. PATENT DOCUMENTS

| | | | | |
|---|---|---|---|---|
| 5,134,499 A | | 7/1992 | Sata et al. .................. | 358/342 |
| 5,293,282 A | | 3/1994 | Squires et al. ........... | 360/77.08 |
| 5,355,486 A | | 10/1994 | Cornaby ..................... | 395/650 |
| 5,371,551 A | * | 12/1994 | Logan et al. ............... | 386/112 |
| 5,396,375 A | | 3/1995 | Nagase et al. ............... | 360/46 |
| 5,701,383 A | * | 12/1997 | Russo et al. ................ | 386/125 |
| 5,889,920 A | | 3/1999 | Compoint et al. | |
| 5,920,340 A | * | 7/1999 | Man et al. .................. | 348/181 |
| 6,018,612 A | * | 1/2000 | Thomason et al. ........... | 386/82 |
| 6,233,389 B1 | * | 5/2001 | Barton et al. ................ | 386/68 |
| 6,304,714 B1 | * | 10/2001 | Krause et al. .............. | 386/125 |

FOREIGN PATENT DOCUMENTS

| | | |
|---|---|---|
| EP | 0 726 574 A2 | 8/1996 |
| WO | WO 98/48566 * | 10/1998 |
| WO | WO 99/33265 | 7/1999 |

OTHER PUBLICATIONS

Dennis M. O'Connor, U.S. Appl. No. 08/996,535, filed Dec. 23, 1997, entitled "Method Of Time Shifting To Simultaneously Record And Play A Data Stream".

Dennis M. O'Connor and Mark P. Chuang, U.S. Appl. No. 09/150,577, filed Sep. 10, 1998, entitled "Time Shifting By Simultaneously Recording and Playing a Data Stream".

US 5,825,354, 10/1998, Ahmad et al. (withdrawn)

* cited by examiner

*Primary Examiner*—Vincent Boccio
(74) *Attorney, Agent, or Firm*—Trop, Pruner & Hu, P.C.

(57) ABSTRACT

A broadcast pause and resume system may simultaneously read and write data to a disk memory by using separate read and write heads which are driven by separate controllers. In this way, information may be read from and written to the same disk at the exact same time, improving the simultaneity of read and write operations of the broadcast pause and resume system.

8 Claims, 11 Drawing Sheets

US 6,937,813 B1

DIGITAL VIDEO STORAGE AND REPLAY SYSTEM

BACKGROUND

This invention relates to the recording and playing back of a video stream. A video stream includes any combination of audio and/or video data streams.

Video streams have typically been recorded on analog media such as a video cassette. A video cassette recorder (VCR) is used to record the video stream on the video cassette. The video stream may arrive via a broadcast signal, via cable, via satellite signal, or from another video playback device. Once the video stream has been recorded, the VCR is used to rewind the recording medium and play what was recorded. However, due to the nature of the analog medium, once the VCR has started recording, it is not possible to play back the portion of the video stream that has already been recorded until the recording session is terminated.

As a result of the inadequacies of analog VCR recording techniques, broadcast pause and resume systems have been developed which use digital storage techniques and random access technology to enable any portion of a stored digital stream to be essentially simultaneously recorded and replayed. Such systems may use hard disk drive memories which alternately write to and read from the hard disk drive memory in successive cycles. As the information is being recorded, it is quickly ready for replay.

A user may watch a television program, record it as the user watches and may institute pause and replay functions in the course of both watching and recording the incoming video steam. This may all be done without interrupting the recording of the ongoing video stream. Thus, while the user is watching a replay played back from the stored video, the storage system continues to record the incoming video so that a continuous recording is available. The user can watch the program from beginning to end, pausing and replaying in the course of the programs without missing any of the program.

Such systems require relatively high capacity, high speed storage devices. Conventional storage systems using buffers may be utilized for this function. However, the faster the storage media, the more realistic the broadcast pause and resume system is in terms of essentially simultaneously recording and playing back video.

Thus, there is a need for better ways to record streaming video so that the information is rapidly available for replay.

DETAILED DESCRIPTION

Figure 1:
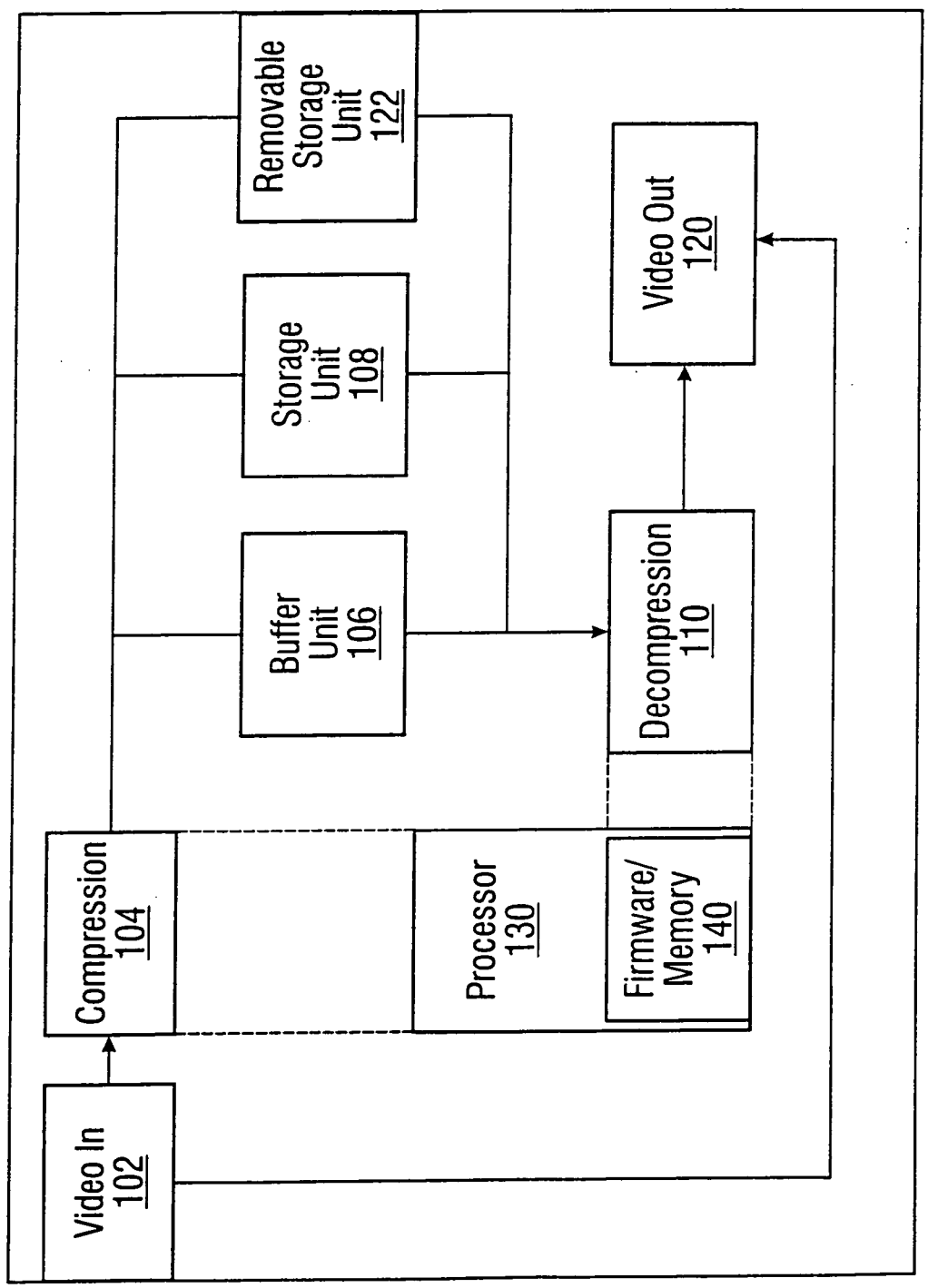
FIG. 1 is a block diagram of a video record and playback system in accordance with one embodiment of the invention.

A video recording and playback system in accordance with one embodiment of the invention, shown in FIG. 1, receives a video stream at the video input port 102. The video stream may be provided by a camera, a television signal, broadcast, cable, or satellite signals, or another video playback device. In one embodiment, an analog-to-digital conversion may be performed on an analog video stream to form a digital video bit stream. In a different embodiment, the video is already in digital form. The video record and playback system 100 may be part of a system, such as a computer system or set top box, so that the video input port 102 may be part of a video capture card in the computer system or set top box.

The digital video stream from the video input port 102 is optionally compressed at compression unit 104. In one embodiment, the video is already compressed and no further compression is needed. The video stream is then stored in the storage unit 108. A buffer unit 106 may be used as temporary storage for providing larger sequential blocks of video data to the storage unit 108. In one embodiment, the buffer unit 106 comprises a random access memory that allows relatively quick access to any portion of the stored video stream.

The video stream is played back by reading the video stream from the storage unit 108. If the video stream was compressed in compression unit 104, then a decompression unit 110 decompresses the retrieved video stream. The video stream is provided from a video output port 120, to a monitor or other display device such as a TV to provide sound and/or video to a user.

A removable storage unit 122 may also be included in video record and playback system. Examples of removable storage units include a writeable compact disk read only memory (CD-ROM), writeable digital video disk (DVD), a flash memory, or another hard disk. The availability of a removable storage unit 122 allows a user to transfer a recording of a video stream stored in storage unit 108 to the removable storage unit 122 and then to transfer the unit 122 to another system at a different location.

In one embodiment, a processor 130 controls the operations of the video record and playback system 100. The compression unit 104 and decompression unit 110 may be implemented in hardware, or the compression and decompression functions of units 104 and 110 may be performed by the processor 130. The processor 130 receives instructions from firmware/memory 140, using technology that is well known.

Figure 2:
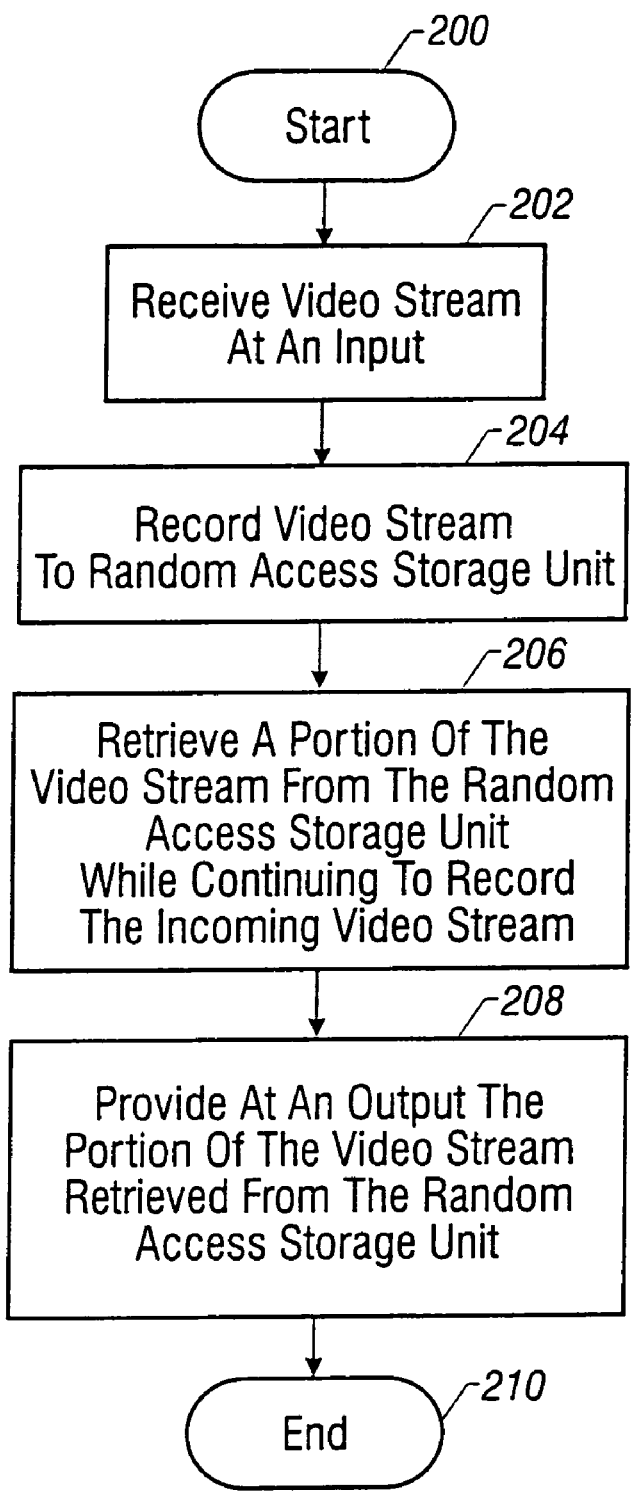
FIG. 2 is a flow chart of one embodiment of the method of providing a time-shifted video stream in accordance with one embodiment of the invention.

FIG. 2 shows a flow chart of an embodiment of a method of providing a time-shifted video stream in accordance with one embodiment of the present invention. The flow chart begins at block 202 where the video stream is received. The recording of the video stream begins at block 204. At block 206, playback of the recorded video stream is performed by retrieving a portion of the video stream from the random access storage unit while the recording of the incoming video stream continues. The retrieved portion of the video stream may be time-shifted from the incoming video stream by a time delay. At block 208, the portion of the video stream retrieved from the random access storage unit is retrieved for display by a television or other display device.

In this way, the record and playback functions are decoupled from one another. The user may now begin watching a recorded TV show from the beginning, e.g., prior to the show being completely recorded.

Figure 3:
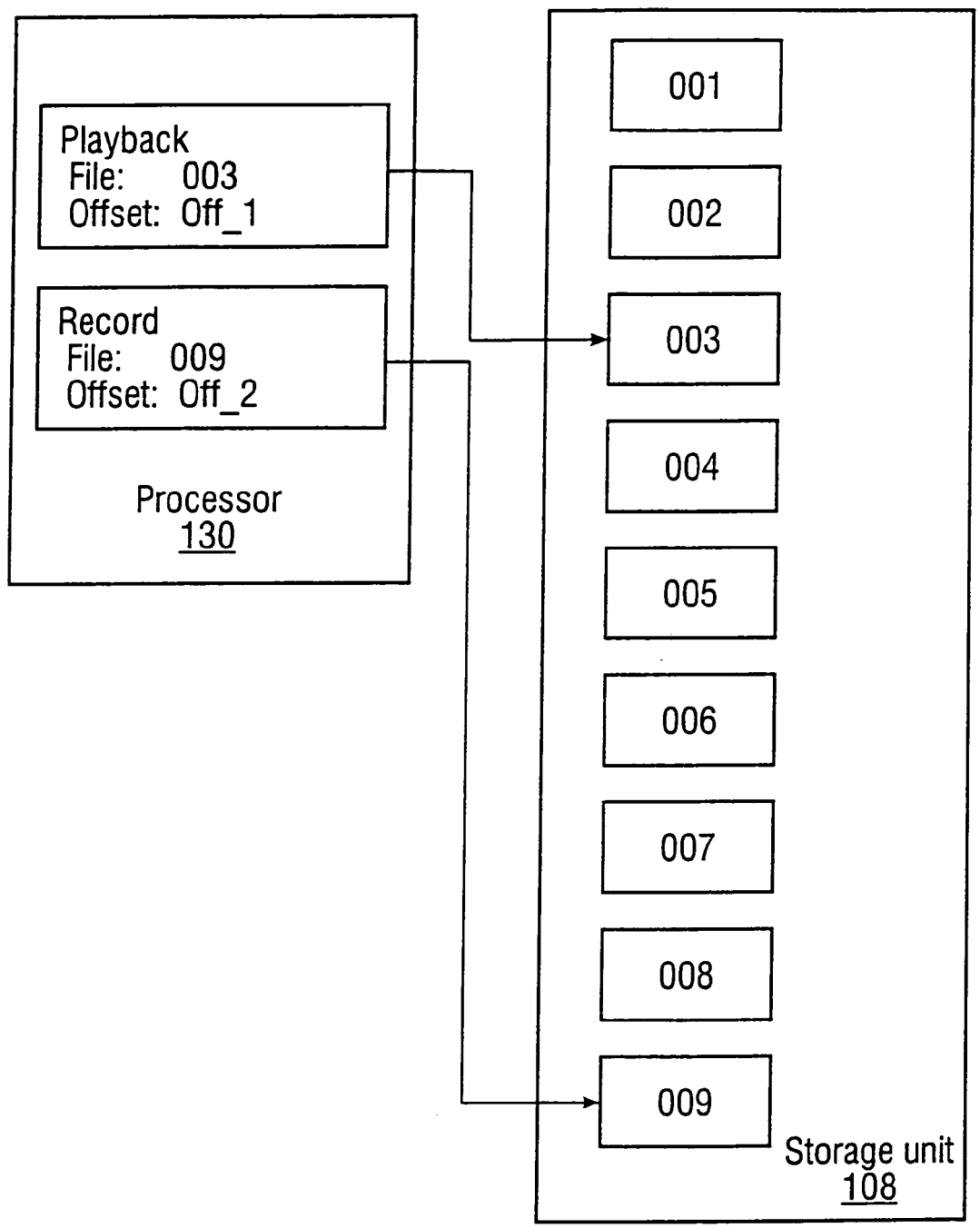
FIG. 3 shows one embodiment of an apparatus for storing the video stream on a hard disk in accordance with one embodiment of the invention.

FIG. 3 shows one embodiment of an apparatus for storing the video stream in the storage unit 108 in accordance with one embodiment of the invention. Again, the invention is not restricted in scope to the illustrated embodiments. In this embodiment, the video stream is stored as separate files 001 and 009 on a hard disk, for example. The processor 130 keeps track of the file and offset into the file of the data being played back, as well as the file and offset into the file of the data being recorded. If the random access storage unit is fast enough, more than one video stream may be recorded and played back at the same time.

Figure 4:
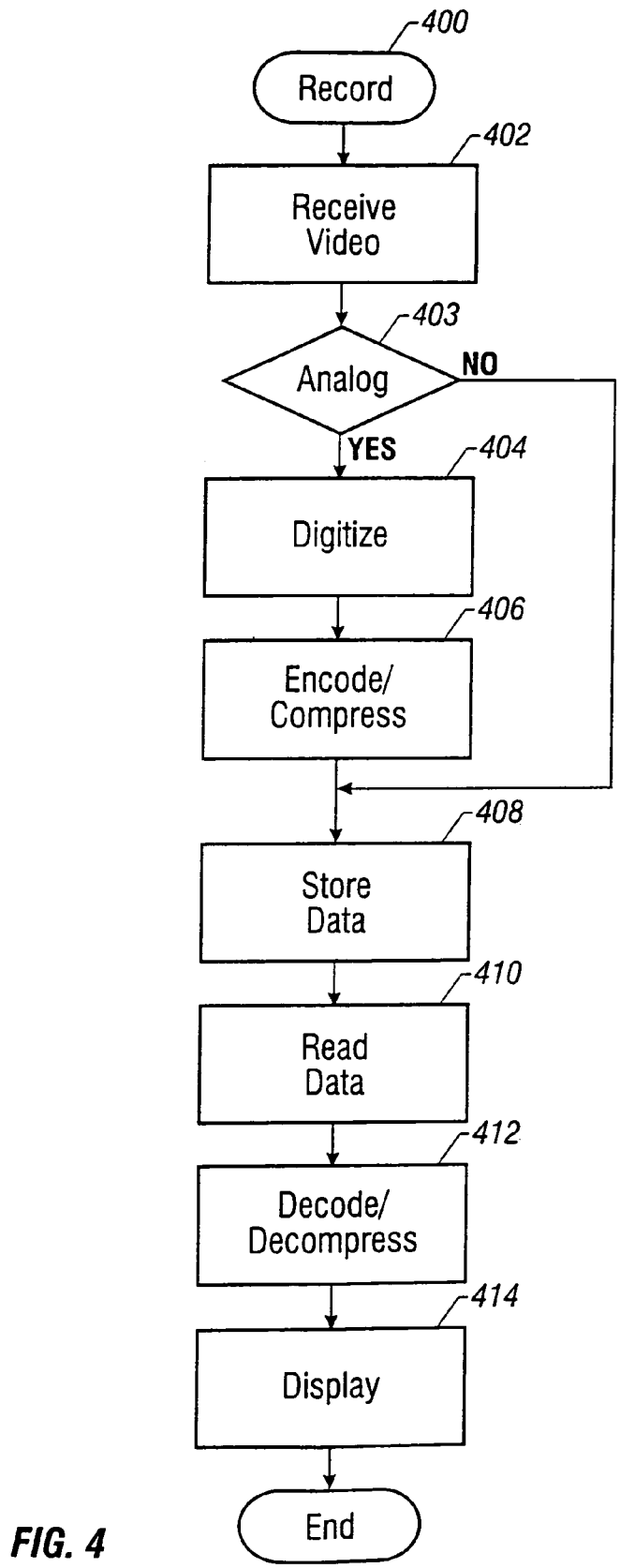
FIG. 4 is a flow chart showing one embodiment of a system for recording and playing back a video stream in accordance with one embodiment of the invention.

Referring now to the embodiment shown in FIG. 4, a flow chart 400 for digitally recording a video stream in accordance with one embodiment of the invention begins by receiving the video stream as indicated in block 402. If the stream is an analog stream (diamond 403), it may be digitized in an analog-to-digital conversion process as indicated at block 404. Next the digital stream may be encoded and compressed, for example using a compression scheme, as indicated in block 406. The stream is read, as indicated at block 410, and stored, as indicated in block 408, in a rotatable disk storage device 108 using magnetic or optical data storage technology. Data that is read from the storage device may be decoded and decompressed using conventional technology, for example, as indicated in block 412, for display as indicated in block 414.

Figure 5:
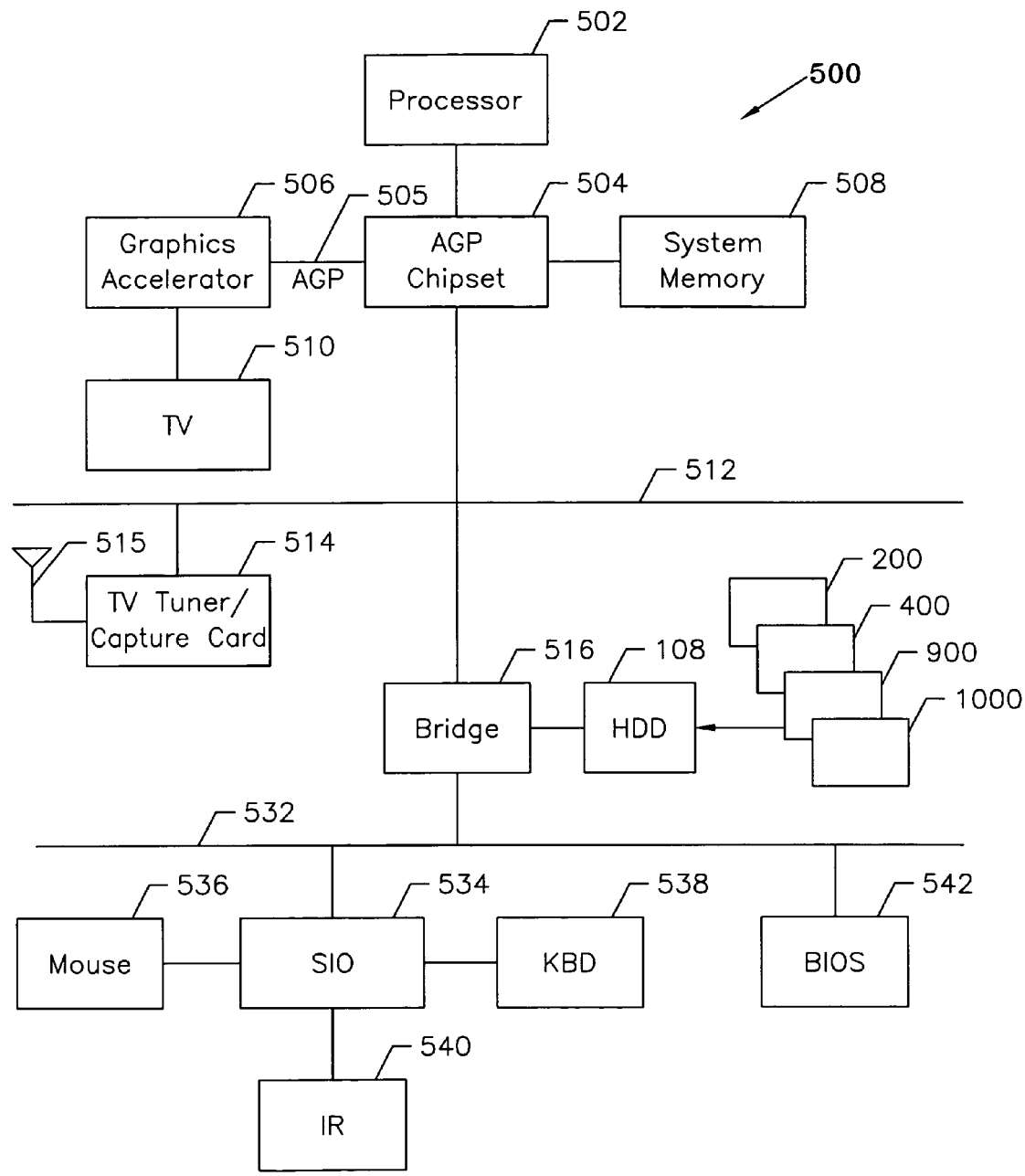
FIG. 5 is a block diagram of a computer system useful in implementing one embodiment of the present invention.

A system 500 in accordance with one embodiment of the present invention, shown in FIG. 5, includes a processor 502. In one embodiment, the processor may be coupled to an accelerated graphics port (AGP) chipset 504 for implementing an accelerated graphics port embodiment. The chipset 504 communicates with the AGP port 505 and the graphics accelerator 506. The television 510 may be coupled to the video output of the graphics accelerator 506. The chipset 504 accommodates the system memory 508. The chipset 504 is also coupled to a bus 512 which may be, for example, a peripheral component interconnect (PCI) bus (PCI Local Bus Specification, Version 2.2 dated Jun. 1, 1998). The bus 512 couples to a TV tuner/capture card 514 which is coupled to an antenna 515 or other video input port, such as a cable input port, a satellite receiver/antenna or the like. The TV tuner and capture card 514 selects a desired television channel and also performs the video capture function (block 402, FIG. 4). One example of video capture card is the ISVR-III video capture card available from Intel Corporation.

The bus 512 is also coupled to a bridge 516 which couples a hard disk drive 108. The software 200, 400, 900 and 1000 may be stored on the hard disk 108. The bridge 516 is also coupled to another bus 532. The bus 532 may be coupled to a serial input/output (SIO) device 534. The device 534 is in turn coupled to conventional components such as a mouse 536, a keyboard 538, and an infrared interface 540. Also coupled to the bus 532 is a basic input/output system (BIOS) 542.

Figure 6:
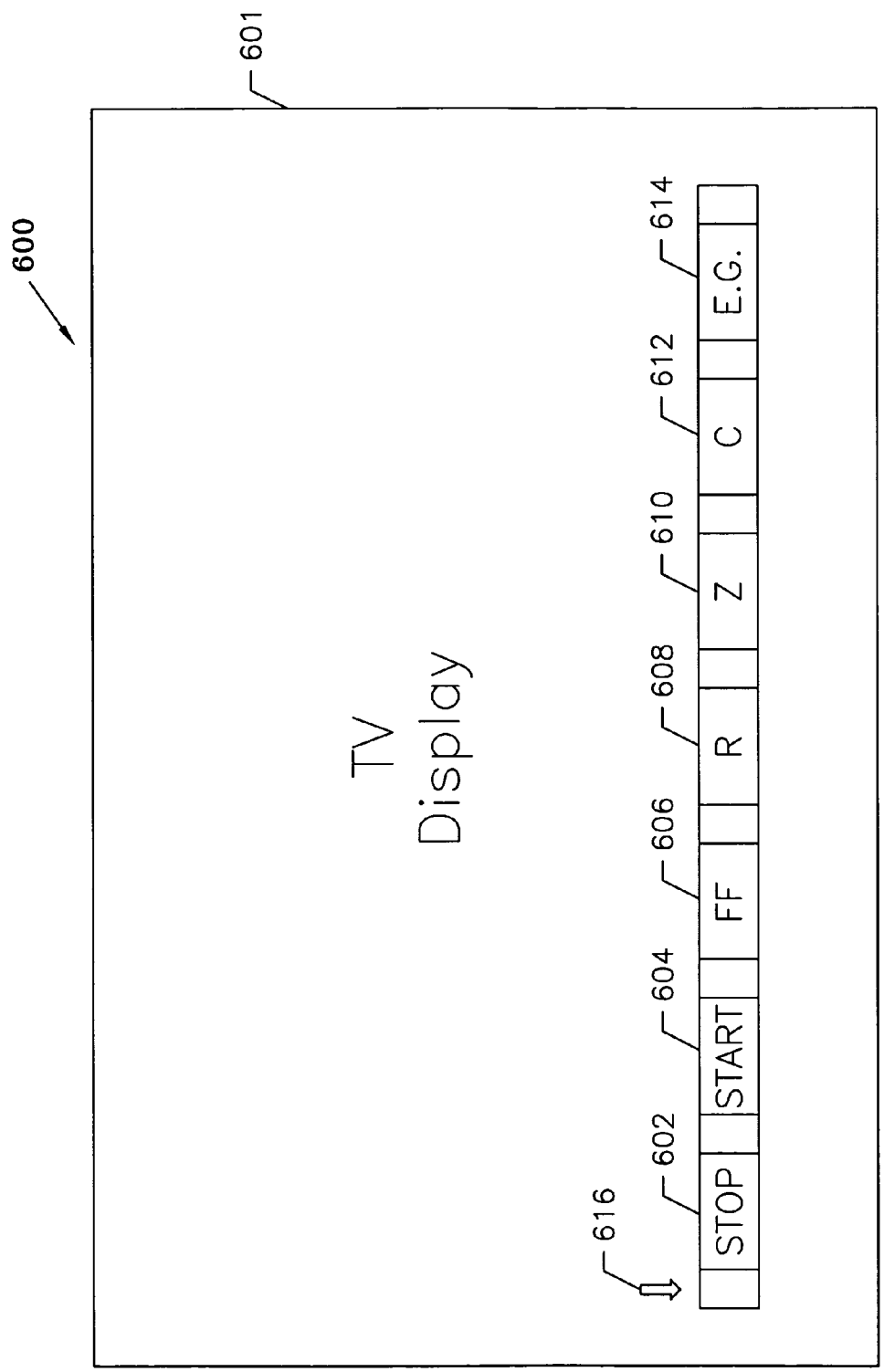
FIG. 6 is an exemplary TV display for implementing an embodiment of the present invention.

An example of a display 600, shown in FIG. 6, for the television 510 may display a conventional television picture or program 601. In addition, the display 600 may have superimposed over the screen, in a discrete fashion, a mouse selectable series of icons, such as the icons 602 through 614. When the mouse cursor 616 selects the appropriate icon, a corresponding feature may be implemented. Among the features that may be implemented in this fashion include a pause or stop function 602, a start record function 604, a fast forward function 606, a rewind function 608. A 10 second replay function 610 "winds" back 10 seconds (or some other amount) and replays the stored video. A catch-up function 612 begins playing back recorded content at a faster than normal rate until the display catches up with a live broadcast and an electronic program guide 614. The above described functions 602, 604, 606, 608, 610, and 612 may also be individual buttons on a remote control unit.

Figure 7:
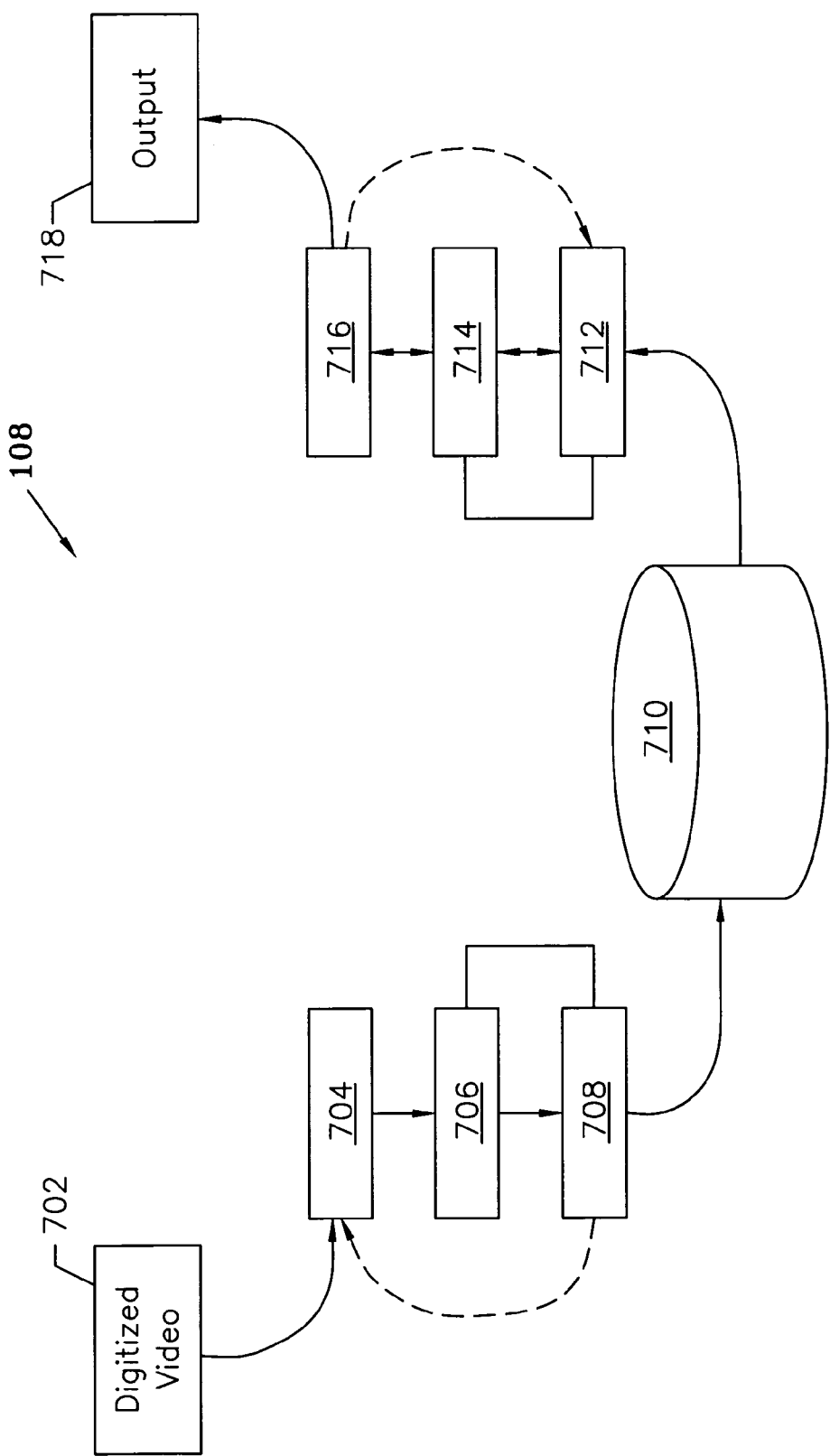
FIG. 7 is a block diagram showing how data is transferred to and from a memory device in accordance with one embodiment of the present invention.
Figure 8:
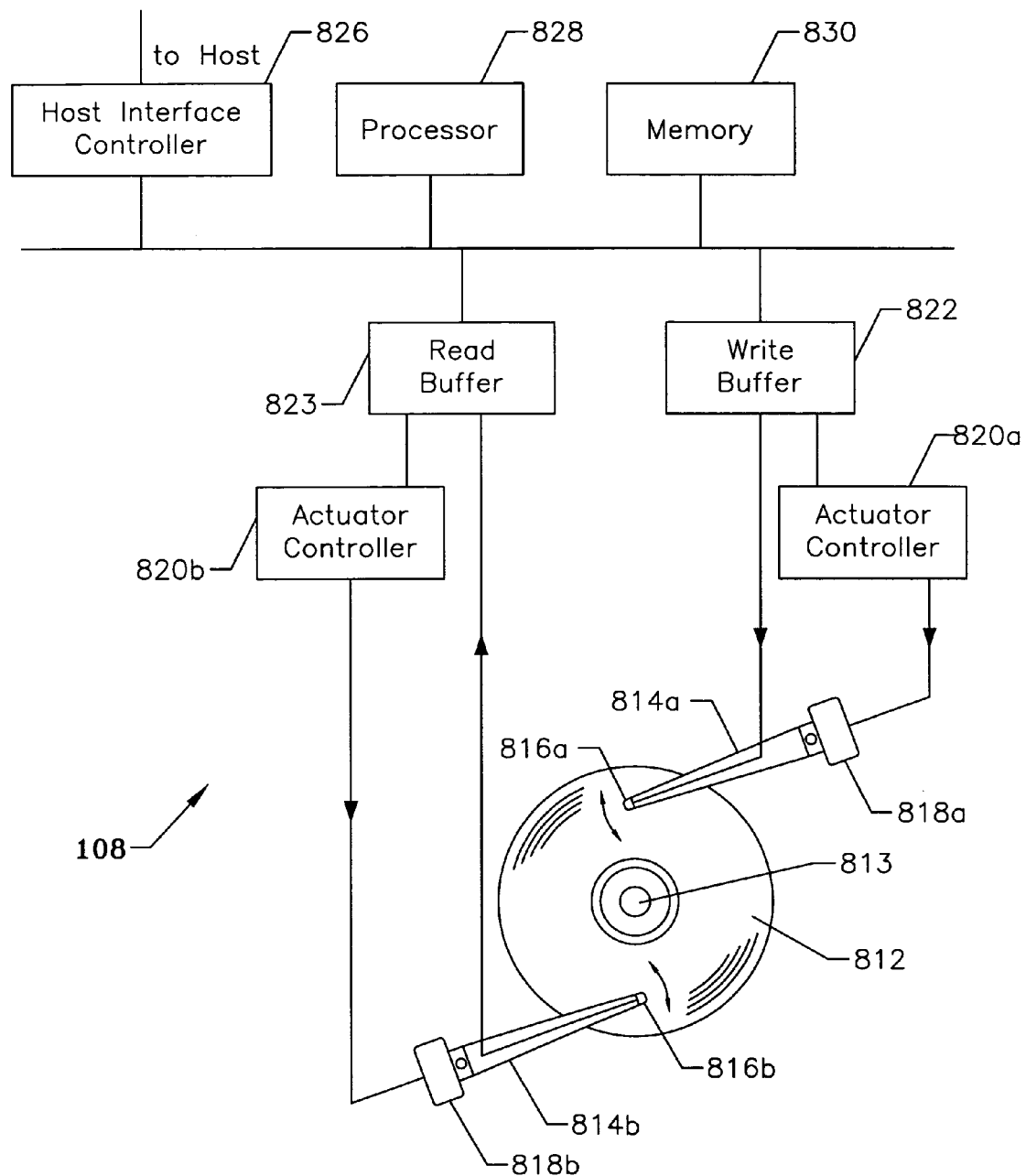
FIG. 8 is a block diagram of a storage system in accordance with one embodiment of the present invention.

A storage system 108 may rapidly store information from the buffers 704 to 708 and read information to the buffers 712 to 716 to an output 718, as shown in FIG. 7. The system 108 may include a host interface controller 826 (FIG. 8) which is coupled to the rest of the host system 500 (FIG. 5). Referring to FIG. 8, the host interface controller 826 is coupled to a bus 824 which also couples a processor 828 and a memory 830. The memory 830 may include volatile and non-volatile memory.

The bus 824 is also coupled to a read buffer 823 and a write buffer 822. Each of the buffers 822, 823 is dedicated entirely to either write or read operations. Thus, the read buffer 823 controls a read actuator controller 820b. The controller 820b in turn controls the actuator 818b of a head actuator 814b. The head actuator 814b carries a read head 816b that reads data from a disk 812 mounted on a spindle 813.

At the same time, a write head actuator 814a writes data through a write head 816a. The write head actuator 814a is controlled by an actuator controller 820a coupled to the write buffer 822. The controller 820a controls the position of the write head 816a through the control of the actuator 818a.

Figure 8A:
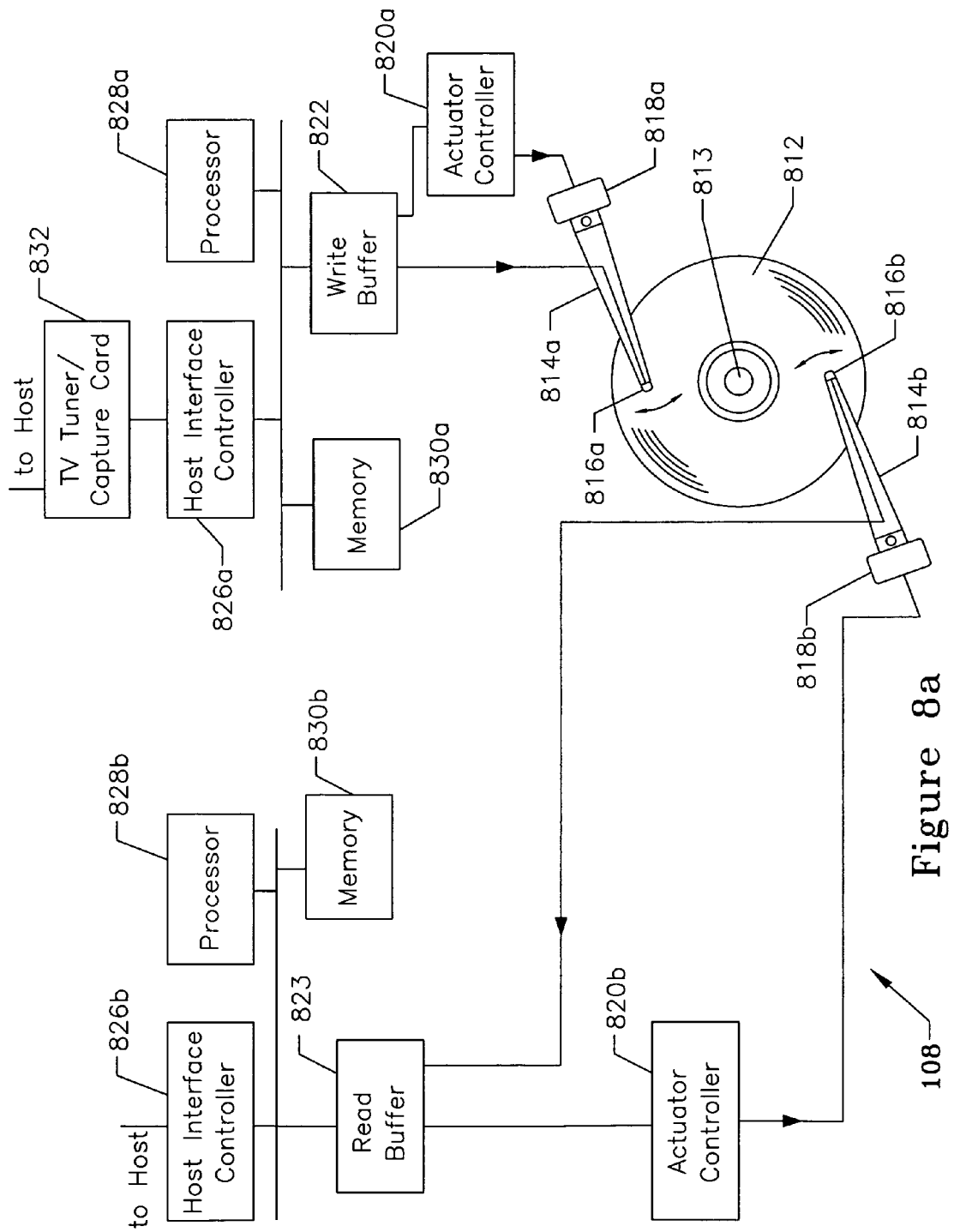
FIG. 8A is a block diagram of a storage system in accordance with an alternate embodiment of the present invention.

Referring to FIG. 8A, another arrangement for coupling the actuators 814 to a host processor-based system 500 may involve coupling the write buffer 822 and read buffer 823 to different host interface controllers 826a and 826b. Each host interface controller is ultimately coupled to the host system 500. However, the write host interface controller 826a may be coupled through a TV tuner/capture card 832 to the host system. Thus, under control from the host system, video received by the TV tuner/capture card 832 may be immediately shunted to the host interface controller 826a, through the write buffer 822 and to the head 816a. This may dramatically increase the speed at which incoming video may be stored on the disk 812.

At the same time, a separate host controller 826b is coupled to the read buffer 823. The read buffer 823 in turn operates as described previously. In this way, independent processor-based controllers may be utilized to control the write and the read heads in order to improve the performance of the write operation in accordance with one embodiment of the present invention.

Thus, streaming video data may be simultaneously written to and read from the disk 812 because two independent systems are utilized for reading and writing data from the same disk. The dual actuators 814 enable dedicated reading and writing functionality and contribute to substantial simultaneity of reading and writing operations. The read and write actuators 814 may operate without interference between themselves because they are situated over opposite halves of the disk 812.

In fact, the use of read-only head or transducer 816b and a write-only head or transducer 816a may result in cost savings since it is not necessary to provide specialized, expensive heads that are capable of handling both write and read operations. Moreover, in some embodiments, slower actuator motors may be used, since there are two heads, resulting in further cost savings.

As used herein, a "read-only" head is a head that only reads video data stored on the disk. A "write-only" head is one that only writes video data to the disk. However, a write-only head may read control information from the disk. Control information may be used to control the characteristics of the write head such as its speed and position. Thus, the term write-only refers to the fact that the audio/video data that is stored in the disk is written only by the head 816a even though a read capability may be utilized to read control information for purposes of controlling the operation of the head 816a in some embodiments of the present invention.

While the present invention has been illustrated in connection with a magnetic memory wherein the device 108 is effectively a hard disk drive, an optical disk reading system may utilize the same dual head concept for recording a video stream.

In FIG. 7, a schematic depiction of the storage system 108 includes a digital storage device such as a hard disk drive 710. The digitized video 702 is initially stored in a buffer which is designated as being currently on the top of the memory stack. The transfer of information between the buffers and the storage device 710 may be done in discrete time periods referred to herein as time steps.

Figure 9:
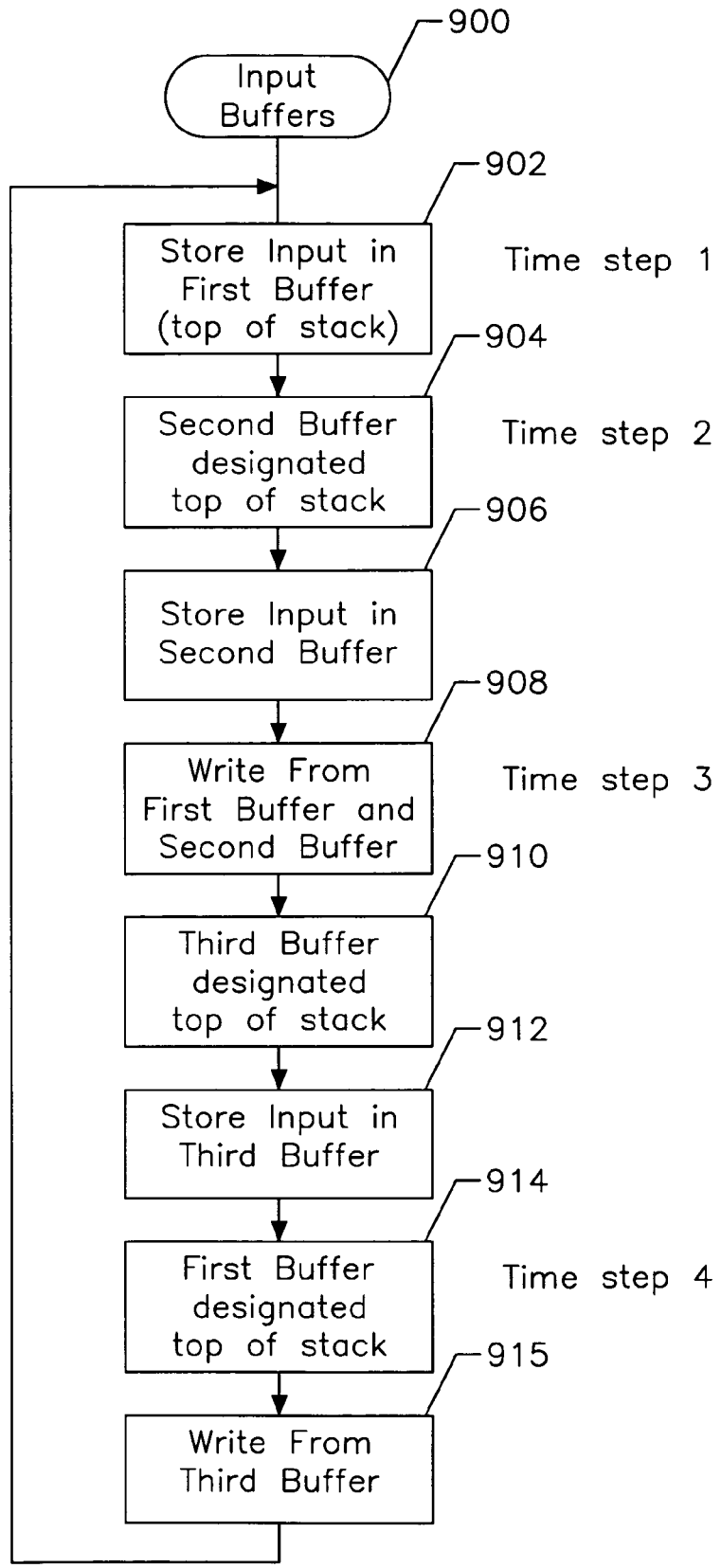
FIG. 9 is a flow chart showing the flow of input video information into a storage device in accordance with one embodiment of the present invention.

In a first time step, shown in FIG. 9, the digitized video 702 (FIG. 7) is stored in memory buffer 704 because that buffer is currently at the top of the memory stack, as indicated in block 902 in FIG. 9.

As the buffer 704 fills up, the buffer 708 moves to the top of the stack (as indicated by the dashed arrow) and incoming video is stored in buffer 708. As indicated in block 904 in FIG. 9 in time step 2, the buffer 708 replaces the buffer 704 as the designated top of the stack buffer. The next input video is then stored in the new buffer (708) as indicated in block 906.

In time step 3 the buffer 708 has filled up and the contents of buffers 704 and 708 are written to the storage device 710 in a single write operation as indicated in block 910. During the same time step, buffer 706 moves to the top of the stack and becomes the storage buffer for incoming video. This is illustrated in blocks 910 and 912 in FIG. 9.

In time step 4, the buffer 704 moves back to the top of the stack to store incoming video since its previous content has already been saved in the storage device 710. This is indicated in block 914 of FIG. 9. Additionally, in time step 4, the content of buffer 706 is written to the storage device 710 as illustrated in block 915. The storing of incoming information, as illustrated in FIG. 9 then cycles back to the top of the flow in FIG. 9 and continues in the same fashion thereafter.

The time steps 1 to 4 illustrate a complete cycle from input to output. The remaining sequence of steps repeat starting at step 1.

Figure 10:
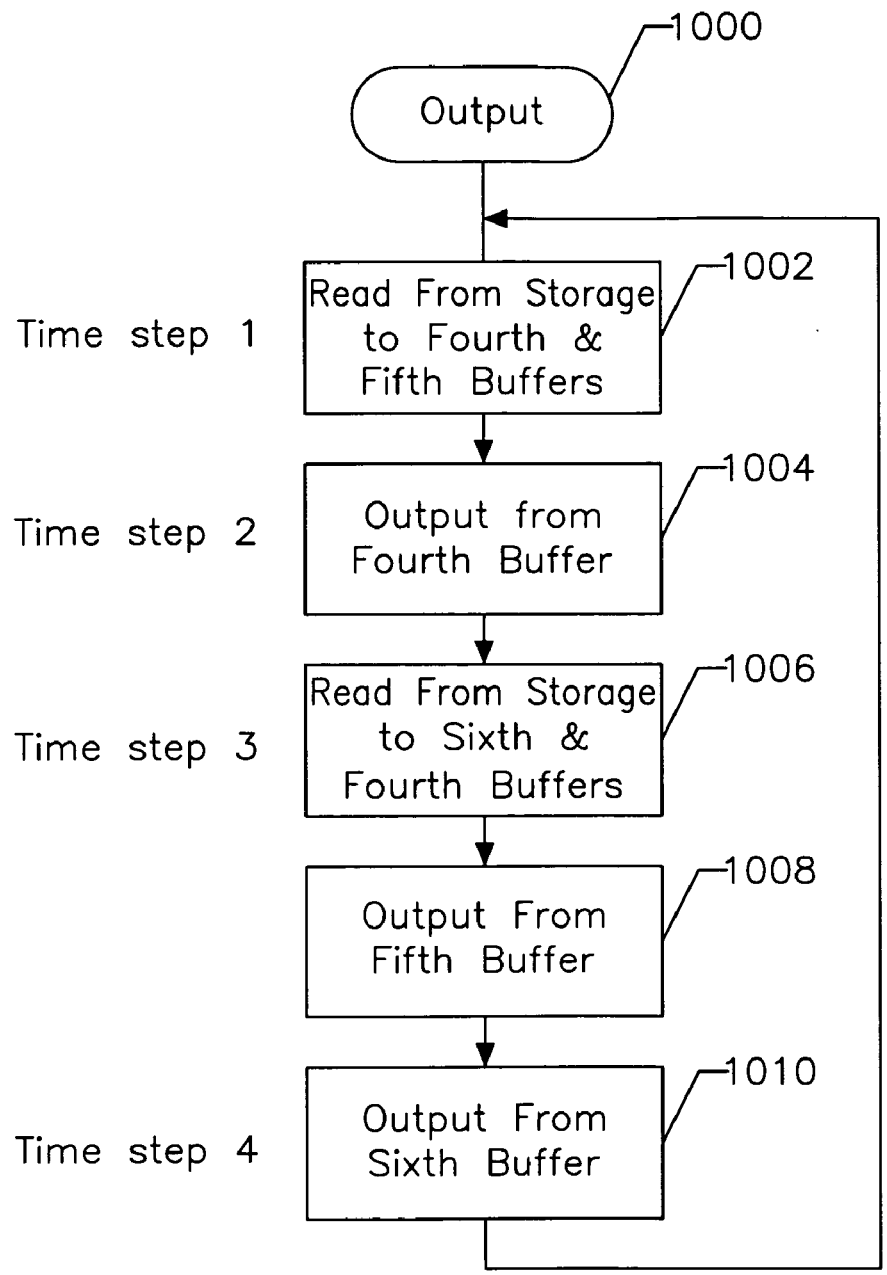
FIG. 10 is a flow chart showing the flow of data from the storage device in accordance with one embodiment of the present invention.

Referring now to FIG. 10 for the read operation, in time step 1, the content of storage device 710 is read into buffer 712 and 714 (block 1002). The contents of buffer 712 are read out in step 2 (block 1004). In time step 3, information stored in the storage device 710 is read to the sixth and fourth buffers (i.e., buffers 714 and 716) as indicated in block 1006. The contents of the fifth buffer (712) are sent to the output port 718 (block 1008).

In time step 4, the contents of the sixth buffer (which is buffer 716) are sent to the output port 718 (block 1010). No other output operations occur.

The writing steps use the actuator 814a. At the same time the reading steps, using a different set of buffers, use the actuator 814b.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a processor;
    a television capture card coupled to said processor;
    a random access memory, coupled to said processor, said memory including a disk having sides and a pair of transducers, including a read transducer to read data from and a write transducer to write data to the same side of the disk at the same time;
    a write host interface controller, coupled to said write transducer, to control the write operations on said write transducer;
    a read host interface controller, coupled to said read transducer, to control the read operations on said read transducer; and
    said read and write host interface controllers being separate and having different functions and said write host interface controller directly connected to said television capture card.

2. The system of claim 1 wherein said disk is a magnetic disk.

3. The system of claim 1 wherein each of said transducers is coupled to a buffer which is independent of the buffer coupled to the other of said transducers.

4. The system of claim 1 wherein said memory may simultaneously read out and write data.

5. The system of claim 4 wherein said memory may simultaneously access any two portions of the memory and read data from one of said portions while writing data to another of said portions.

6. The system of claim 1 including a first set of buffers coupled to one transducer and a second set of buffers coupled to the other transducer.

7. The system of claim 6 wherein said data passes from buffer to buffer within each set.

8. The system of claim 7 wherein data passes from the first set of buffers to one transducer and from the other transducer to the second set of buffers.

\* \* \* \* \*